March 17, 1970    R. W. CASHMAN ET AL    3,500,523
TOOL HOLDER CONSTRUCTION
Filed Aug. 14, 1967
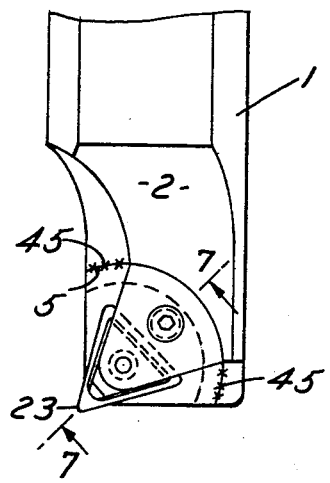
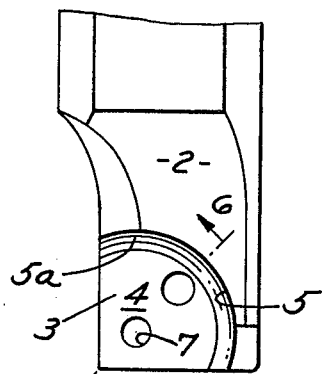
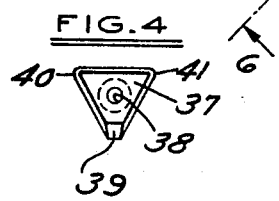
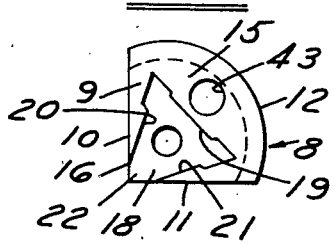
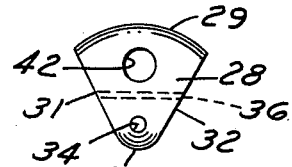
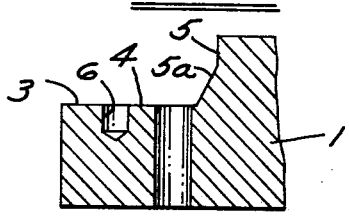
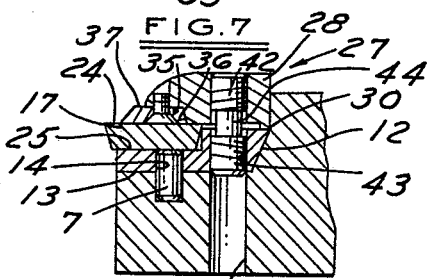
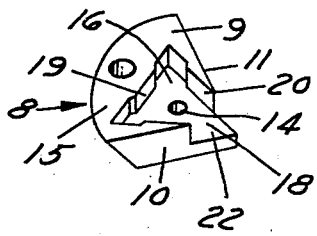
INVENTORS
ROBERT W. CASHMAN
ANTHONY WASCO, JR.
BY
Learman & McCulloch
ATTORNEYS

United States Patent Office 3,500,523
Patented Mar. 17, 1970

1

3,500,523
TOOL HOLDER CONSTRUCTION
Robert W. Cashman and Anthony Wasco, Jr., Saginaw, Mich., assignors to Saginaw Machine and Tool Company, Saginaw, Mich., a corporation of Michigan
Filed Aug. 14, 1967, Ser. No. 660,475
Int. Cl. B23p 15/28; B26d 1/00
U.S. Cl. 29—96
7 Claims

ABSTRACT OF THE DISCLOSURE

A tool holder comprising a body having a segment-shaped recess at one end in which is secured a correspondingly shaped carrier provided with a tool bit-accommodating pocket in which an indexable tool bit is adapted to be received and including a clamp adapted to overlie the carrier for clamping the tool bit in the pocket, the clamp having a recess in which is secured an indexable chip breaker that is adapted to overlie and assist in the clamping of the tool bit.

---

The invention disclosed herein comprises a holder for an indexable tool bit, a carrier for locating the tool bit in any one of a selected number of positions, and an indexable chip breaker carried by and forming part of a clamping device by means of which the tool bit is clamped in place.

Indexable tool bits commonly are used in conjunction with holders therefor and such holders conventionally constitute a fairly large, heavy body of metal in which is formed a pocket corresponding to the shape of the tool bit that is to be accommodated therein. Such a holder has several disadvantages. For example, vibration and strain improsed on the tool bit during cutting operations eventually cause deterioration of the pocket, thereby preventing precise mounting of a tool bit and necessitating discard of the holder. Moreover, such a tool holder cannot be utilized to support a tool bit in an angular position other than that defined by the pocket.

Conventional holders for indexable tool bits are provided with clamps for clamping the tool bits in the respective pockets. The orientation of such clamps with respect to the bit-accommodating pockets is such that a clamp is effective in one angular position only of the tool bit. That is, in a conventional tool holder construction the tool bit clamp is so positioned as to provide proper clamping forces on the tool bit when the latter is in a single position of orientation with respect to the longitudinal axis of the tool holder, thereby precluding any angular adjustment of the tool bit.

It is conventional practice to interpose a chip breaker between an indexable tool bit and the tool bit clamp and to utilize the tool bit clamp to fix the chip breaker in place. In some cases the tool bit clamp itself is so constructed as to function as the chip breaker. A chip breaker, like a tool bit, is subjected to wear during cutting operations. Moreover, the configuration of a chip breaker may be suitable for one kind of cutting operation, but unsuitable for another kind of cutting operation performed by the same tool bit. Accordingly, it has been the practice heretofore to provide a chip breaker which is a compromise between two or more different kinds of cutting operations or alternatively to substitute one chip breaker for another during different cutting operations. In addition, it has been the practice heretofore to discard combined clamp and chip breaker members when they become worn from use.

An object of this invention is to provide a tool holder for an indexable tool bit and in which the tool bit may be adjusted to any one of a large number of angular positions.

Another object of the invention is to provide a tool holder construction having a disposable carrier for a tool bit and which carrier may be replaced without modification or machining of the tool holder.

A further object of the invention is to provide a tool holder of the kind referred to provided with means for clamping a tool bit in any angularly adjusted position relative to the tool holder.

A further object of the invention is to provide a tool bit clamp and chip breaker construction in which the chip breaker is indexable and may be provided with any one of a number of different configurations.

Other objects and advantages of the invention will be pointed out specifically or will become apparent from the following description when it is considered in conjunction with the appended claims and the accompanying drawings, in which:

FIGURE 1 is a fragmentary plan view of a tool holder, clamp and chip breaker assembly constructed in accordance with the invention;

FIGURE 2 is a view similar to FIGURE 1, but with certain parts omitted;

FIGURE 3 is a plan view of a tool bit carrier according to the invention;

FIGURE 4 is a plan view of an indexable chip breaker forming part of the invention;

FIGURE 5 is a plan view of a tool bit and chip breaker clamp member;

FIGURE 6 is a sectional view taken on the line 6—6 of FIGURE 2;

FIGURE 7 is a sectional view taken on the line 7—7 of FIGURE 1; and

FIGURE 8 is a perspective view of the tool bit carrier.

A tool holder constructed in accordance with the invention comprises a body 1 formed of metal and having a reduced end 2 in which is formed a segment-shaped recess 3 having a flat base 4 and an arcuate wall 5 the lower portion 5a of which is inclined upwardly and rearwardly from the one end of the body. At the center of the arc on which the wall 5 is formed, the body is provided with an opening 6 in which a pivot post or pin 7 is secured.

A tool bit carrier 8 is adapted for reception in the recess 3 and comprises a segment-shaped wafer member 9 having vertical side edges 10 and 11 intersecting at corresponding ends in a right angle and joined at their opposite ends by an arcuate, inclined wall 12 which seats on the recess wall 5a and has a curvature and inclination corresponding to the curvature and inclination of the recess wall 5a. The member 9 has a flat bottom 13 which rests upon the recess base 3, and the member 9 is provided with an opening 14 for the pivotal accommodation of the post 7. The construction and arrangement are such that, when the member 9 is received in the recess 3, the member 9 may be pivoted about the axis of the post 7 to any one of a number of angular positions with respect to the longitudinal axis of the tool holder body 1.

The tool bit carrier 8 has a flat upper surface 15 in which is provided a recess 16 for the removable accommodation of an indexable carbide or similar tool bit 17. In the disclosed embodiment, the recess 16 is generally triangular in shape and has a flat bottom 18 bounded by three upstanding side walls 19, 20 and 21. The walls 20 and 21 converge toward the forward end of the body 1 along lines which intersect beyond the confines of the carrier 8 so as to provide a gap 22 through which a tip 23 of the tool bit 17 may project. The bit 17 has flat upper and lower surfaces 24 and 25, respectively, and preferably has a thickness somewhat greater than the depth of the recess 16 so as to project above the upper surface of the carrier member 9. The side walls of the bit 17 preferably are inclined downwardly so as to enable the bit snugly to be accommodated in the pocket 16. Although the bit 17 disclosed herein is triangular in configuration, it will be understood that the bit may have any other suitable geometric configuration and that the bit-accommodating pocket 16 will have a corresponding configuration.

Clamping means 27 is provided for clamping the tool bit removably in the pocket 18 and comprises a generally triangularly shaped clamp body 28 having an arcuate rearward end 29 which seats upon and has a curvature corresponding substantially to the curvature of the rear wall 12 of the carrier 8. A rib 30 is provided on the lower, rear surface of the body 28 to bear upon the upper surface of the carrier body 9. The arcuate wall 29 is joined at its opposite ends to forwardly converging walls 31 and 32 which merge at the forward end of the body 28 in a smoothly rounded nose 33. At the center of the circle on which the arcuate wall 29 is formed is a threaded opening 34. The lower surface of the body 28 is provided with a transverse groove 35 having a flat, rearwardly inclined rear wall 36. Accommodated in the groove 35 is a substantially triangular, carbide or the like chip breaker 37 that is centrally apertured for reception of a screw 38 that is threaded into the opening 34 so as to fix the chip breaker 37 in the groove 35 with one of its sides seated on the wall 36. The thickness of the chip breaker 37 preferably corresponds to the depth of the groove 35 so that the lower surface of the chip breaker is flush with the lower surface of the body 28.

The side walls of the chip breaker 37 preferably are inclined to correspond to the inclination of the groove wall 36 so that any one of the three sides of the chip breaker may be seated against the wall 36. The size of the chip breaker is such that, when it is accommodated in the groove 35, one of its three tips 39, 40 or 41 is positioned between the projecting tip 23 of the tool bit 17 and the forward end 33 of the clamp body 28 so as to be located in a position to engage and effect breaking of chips cut by the tool bit. As is indicated in FIGURE 4, the particular configuration of the three tips of the chip breaker may vary one from the other in accordance with the preferred form for the kind of cutting operation being performed.

The clamp body 28 is provided with a threaded opening 42 located on a radial line extending between the wall 29 and the opening 34 and midway between the side walls 31 and 32. The opening 42 is adapted to be aligned with an oppositely threaded opening 43 which may be formed in the carrier 8 on a radial line located midway between the side walls 10 and 11. A screw 44 having oppositely threaded ends is adapted to be threaded into the openings 42 and 43 so as to anchor the clamp body 28 to the carrier 9 with the chip breaker 37 overlying and bearing against the tool bit 17 and assisting in the clamping of the latter in the pocket 16.

The tool holder body 1 is adapted to be manufactured in large groups, each holder being of substantially uniform construction and each having the pivot pin 7 fixed therein. The carrier 8, the clamp 27 and the chip breaker 37 also are adapted to be manufactured in large groups and assembled, each assembly being capable of being accommodated in the recess 3 of any of the tool holder bodies. Thus, any one assembly may be fitted in the recess 3 of any tool holder body and be rocked about the axis of the pivot pin 7 to any desired angular relationship between the projecting cutting tip 23 and the longitudinal axis of the body 1. In FIGURE 1, the cutting tip 23 projects from the body 1 at an angle of substantially 45° to the longitudinal axis of the body, but such angle could be greater or less than 45°.

When the projecting end of the tool bit is properly oriented with respect to the longitudinal axis of the tool holder body 1, the carrier 8 separably may be fixed to the body 1 by brazing the carrier to the body on opposite sides of the clamp body 28 as is indicated at 45 in FIGURE 1. Regardless of the angular position of the assembly of the carrier, the tool bit and the clamp, the cutting tip 23, the projecting end of the chip breaker 37, the pivot pin 7 and the anchor screw 44 will be in alignment with the direction of feed of the cutting tool to the workpiece to be machined. Thus, the cutting pressure imposes no forces on the assembly tending to effect relative rocking of the parts of the assembly and the brazing is sufficient to anchor the assembly securely to the tool body 1. If it is desired, however, the tool body may be provided with a drilled opening or socket 46 into which the anchor screw 44 may project, the drilling of the opening 46 being effected following proper orientation of the bit carrier 8 and its associated parts with reference to the recess 3. In this instance the screw 44 serves as a locking pin to prevent relative rotation of the members 1 and 8 during the brazing operation.

During the use of the apparatus, the clamp means 27 may be removed from the bit carrier 8 whenever it is desired to index the bit 17 to present a fresh cutting tip to a workpiece or whenever it is desired to index the chip breaker 37 to align another tip with the tool bit. When the tool bit and the chip breaker become worn and unsuited for further use, they may be replaced.

If it should be necessary to replace the carrier 8 due to wear of the pocket 16, the brazing material may be melted so as to permit removal of the bit carrier 8 and its associated parts. A fresh carrier then may be assembled with the tool body 1 and fixed by brazing to the body. By utilization of the parts 44 and 46, the orientation of the substituted carrier and tool bit will be exactly the same as the replaced parts.

The disclosed embodiment is representative of a presently preferred form of the invention, but is intended to be illustrative rather than definitive thereof. The invention is defined in the claims.

What is claimed is:

1. A tool holder construction comprising a body terminating at one end in a segment shaped recess defined by a base and an arcuate wall upstanding from said base; a segment shaped carrier corresponding substantially in size and shape to the size and shape of said recess and having an arcuate wall corresponding to the curvature of the arcuate wall of said recess, said carrier having a multi-sided pocket therein adapted for the removable reception of a tool bit having a plurality of tips defined by sides corresponding to the number of sides of said pocket, said pocket having an opening therein through which any selected one of the tips of said bit may project; a clamp member having at one end thereof an arcuate wall corresponding to the curvature of the arcuate wall of said recess, the opposite end of said clamp member having a groove therein; a chip breaker accommodated in said groove and projecting beyond said other end of said clamp member; a pin located at the center of the circle on which the arcuate wall of said recess is formed and rotatably coupling said carrier to said body with the arcuate wall of said carrier abutting said arcuate wall of said recess; means removably securing said clamp member to said carrier with said chip breaker overlying and confronting said pocket and with the arcuate wall of said clamp member abutting the arcuate wall of said recess; and separable means securing said carrier to said body with said carrier in a selected position of rotary adjustment relative to said body.

2. The construction set forth in claim 1 wherein said chip breaker has a plurality of tips defined by a plurality of sides, said groove having a flat edge between the ends of said clamp member and against which any one of the sides of said chip breaker may abut.

3. The construction set forth in claim 2 wherein said flat edge of said groove is inclined and wherein each of the sides of said chip breaker is correspondingly inclined.

4. The construction set forth in claim 1 including means removably securing said chip breaker in said groove.

5. The construction set forth in claim 1 wherein at least one of the tips of said chip breaker has a configuration different from the remaining tips thereof.

6. The construction set forth in claim 1 wherein said clamp member has a surface confronting said pocket and wherein said groove has a single, flat edge extending laterally of said clamp member between the ends thereof, said chip breaker having a plurality of tips defined by a plurality of sides any one of which may abut said flat edge, and means removably securing said chip breaker in said groove and substantially flush with said surface of said clamp member, the removability of said securing means enabling said chip breaker to be indexed relatively to said clamp member.

7. The construction set forth in claim 6 wherein at least one of said tips of said chip breaker has a configuration different from that of the remaining tips.

References Cited

UNITED STATES PATENTS

| | | | |
|---|---|---|---|
| 1,104,980 | 7/1914 | Fry | 29—98 X |
| 2,808,638 | 10/1957 | Filippi | 29—96 |
| 2,967,345 | 1/1961 | Novkov | 29—96 |
| 3,052,952 | 9/1962 | Bader | 29—96 |
| 3,124,866 | 3/1964 | Novkov | 29—96 |
| 3,189,975 | 6/1965 | Hammers | 29—96 |
| 3,299,491 | 1/1967 | Hall | 29—96 |
| 3,335,480 | 8/1967 | Cashman | 29—96 |

HARRISON L. HINSON, Primary Examiner